Dec. 16, 1958  M. OLLEY ET AL  2,864,573
ENGINE MOUNTING
Filed Feb. 5, 1954  2 Sheets-Sheet 1

INVENTORS
Maurice Olley &
BY Phillip C. Bowser
ATTORNEY

Dec. 16, 1958
M. OLLEY ET AL
2,864,573
ENGINE MOUNTING
Filed Feb. 5, 1954
2 Sheets-Sheet 2
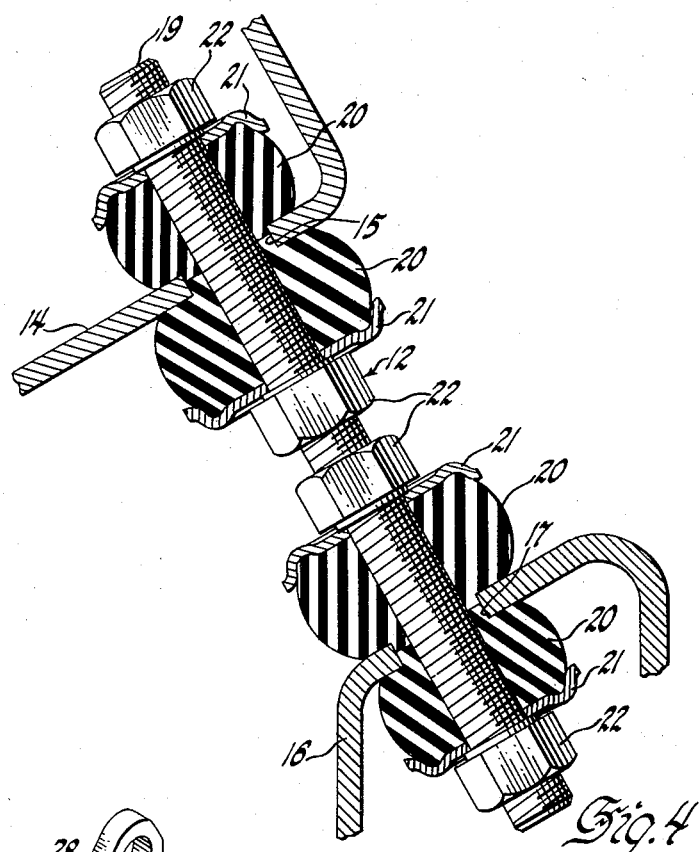
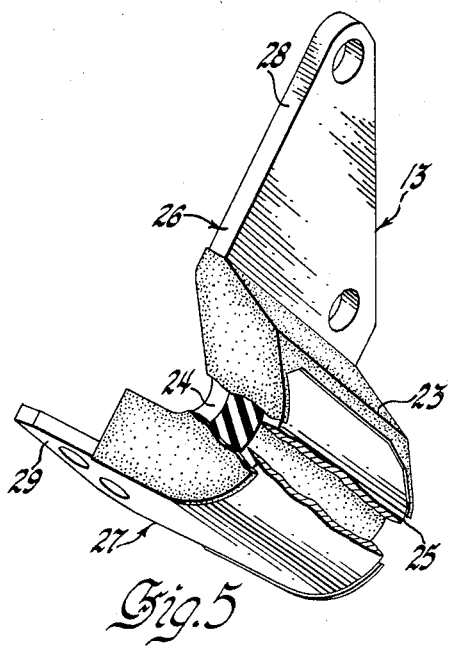
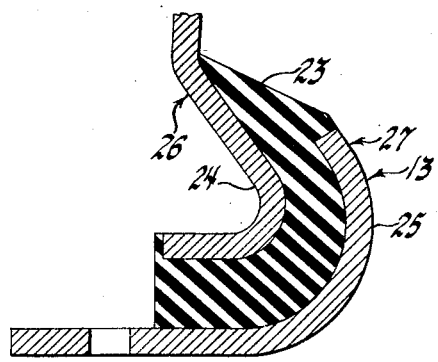
INVENTORS
Maurice Olley &
BY Phillip C. Bowser
ATTORNEY

United States Patent Office 2,864,573
Patented Dec. 16, 1958

2,864,573

ENGINE MOUNTING

Maurice Olley, Detroit, and Phillip C. Bowser, Roseville, Mich., assignors to General Motors Corporation, Detroit, Mich., a corporation of Delaware Application February 5, 1954, Serial No. 408,493

2 Claims. (Cl. 248—9)

This invention relates to engines and like devices, and more particularly to means for mounting automobile engines.

The control of vibrations occurring in automobiles is a complex problem which heretofore has not been satisfactorily solved. This is especially true in the case of vibrations, other than those directly caused by the operation of the engine.

The operation of an automobile engine causes the engine to vibrate in the audible frequency range. To prevent the transmission of these vibrations to the frame and other parts of the automobile to the extent that objectionable noises are produced, it is common to isolate the engine from the frame by the use of rubber cushions and the like in the engine mountings. These vibrations include torsional vibrations about the principal axis of rotation of the engine. Therefore, it has been the practice to mount the engine so that it is free to oscillate about this axis.

Though the engine vibrations caused by its operation have been isolated reasonably well by the present day engine mounts, other engine vibrations, which are not related to engine operation but to roughness of road surfaces and the like, are still a problem. When an automobile is driven over a rough road, the wheels hop or vibrate at relatively low frequencies. Despite the provision of the usual wheel suspension systems, these low frequency vibrations are transmitted to the frame to the extent that the passenger is made uncomfortable because the entire automobile shakes. This is evidenced by hood patter, frame sag vibration, lateral shaking, and various rattles.

It has been found that the frequencies of vibration to which engine mounts are tuned has a great deal to do with the extent to which wheel hop produces the above objectionable results. Tuning of the mounts to frequencies above the wheel hop frequency tends to suppress rather than to amplify the low frequency shaking of the frame in the vertical and lateral directions. One defect in present day mounts is that in order to eliminate the effects of high frequency engine vibration, it has been necessary to construct these mounts so that they lack vertical and lateral stiffness. In other words, the resilient members thereof are too soft, and thus the mounts are generally tuned to frequencies which are lower than wheel hop frequency. This being so, the heavy engine mass is not effective in suppressing the effects of wheel hop, and may amplify such effects.

It is now proposed to provide an engine mount which in addition to isolating high frequency vibrations and permitting free oscillation of the engine about its principal axis of rotation, also provides greater vertical and lateral stiffness so that the mount is tuned to frequencies above wheel hop frequency. This is made possible by providing resiliently pivoted link type mounting units in which the freedom of relative motion between the engine and the frame in the case of engine oscillation is provided mostly by length of the pivoting link, and not by the deformation of the resilient members associated with the links. Stiffer and simpler resilient members reacting to all vibrations mostly in compression may thus be employed in the mounting units. The individual mounting units are placed at or near the nodal points of vertical and lateral engine vibration so that lesser amplitudes of vibration are encountered.

In the drawings:

Figure 4 is a cross-sectional view of one of the front mounting units shown by Figures 1 and 2.

Figure 5 is a perspective view of one of the rear mounting units shown by Figures 1 and 3, with portions thereof broken away to better illustrate the details of construction.

Figure 6 is a cross-sectional view taken along the plane of line 6—6 of Figure 3 and looking in the direction of the arrows.

Figure 1:
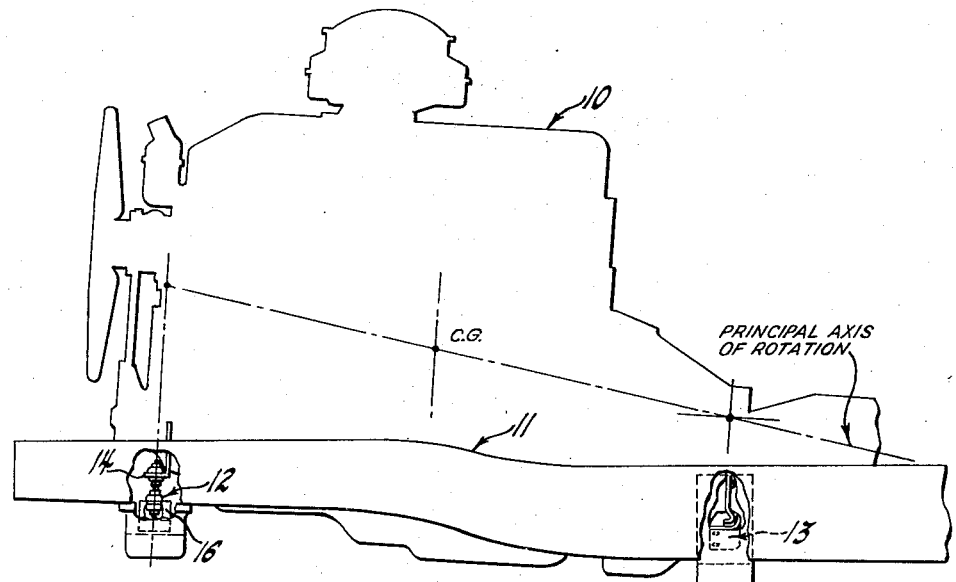
Figure 1 is a side elevational view of an engine having a mounting embodying the invention. Portions of the structure are broken away to better illustrate the details of mounting.

Referring to the drawings in more detail, an automobile engine 10 is mounted on an automobile frame 11 by means of front mounting units 12 and rear mounting units 13. In order that lesser amplitudes of vibration be encountered, units 12 and 13 are preferably located at nodes of the vertical and horizontal bending vibrations of the engine.

The engine 10 may be adapted at the front end thereof for mounting on frame 11 by providing a flange 14 thereon with the flange having a pair of apertures 15 therein. Frame cross member 18 may be adapted to support the front end of engine 10 by providing brackets 16, each bracket having an aperture 17. It will be noted that the surfaces at each end of flange 14 through which aperture 15 is formed are adjacent and parallel to similarly disposed surfaces of the closer bracket 16 through which aperture 17 is formed. All of these surfaces are preferably located substantially parallel to the engine crankshaft.

Figure 2:
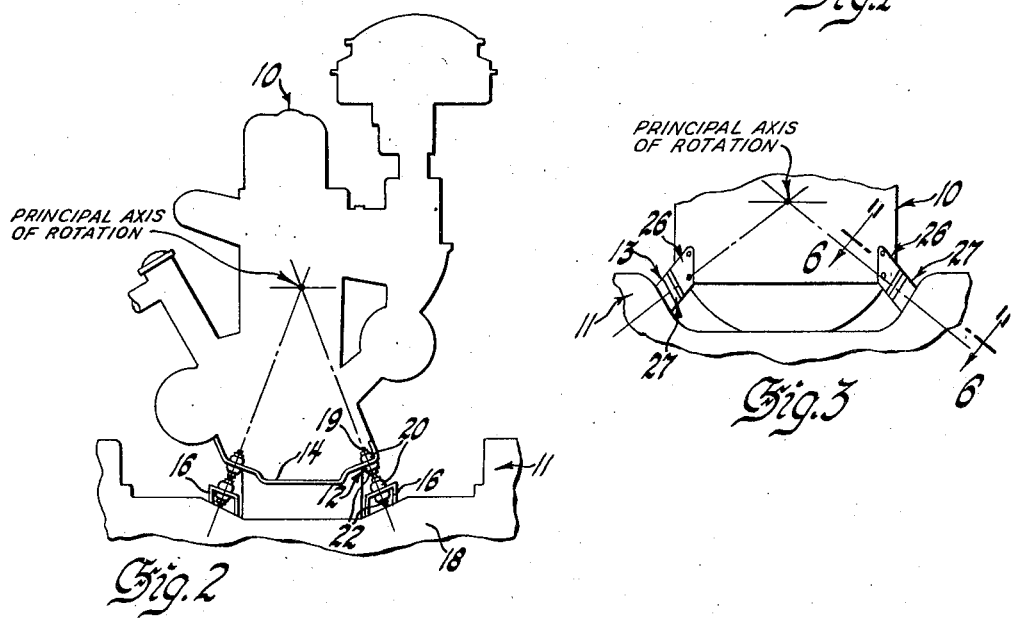
Figure 2 is a front end elevational view of the structure shown by Figure 1.
Figure 3:
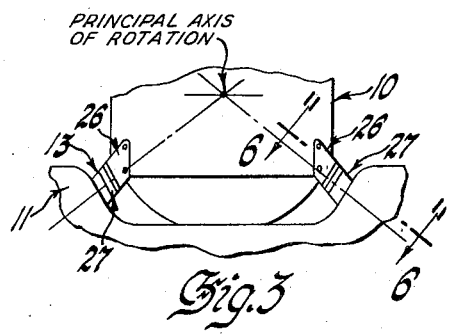
Figure 3 is a fragmentary rear elevational view of the structure shown by Figure 1.

The front mounting units 12 each comprise a stud 19 threaded at both ends thereof and extending between one end of flange 14 and one of the brackets 16, through apertures 15 and 17. The axis of each stud 19 is substantially normal to the axis of the crankshaft, and it intersects the principal axis of rotation of engine 10 as shown by the broken lines in Figure 2. It will be noted that the ends of stud 19 are completely isolated from flange 14 and brackets 16 by means of resilient cushions 20, which may be retained by suitably formed metal washers 21 and nuts 22, as best shown by Figure 4.

The rear mounting units 13, as shown by Figures 5 and 6, each comprise an arcuate resilient member 23 bonded between concentrically spaced ends 24 and 25 of brackets 26 and 27. Ends 28 and 29 of brackets 26 and 27 may be bolted to engine 10 and frame 11, or otherwise secured thereto.

At certain engine speeds, depending upon the engine structure and the stiffness thereof, resonant bending vibrations of the engine are set up in vertical and lateral directions. It has been found that, as to these particular vibrations and in accordance with the well known characteristics of such vibrations, there exist points at the front and at the rear of the engine where the amplitudes of vibration are or approach zero. These points are similar to adjacent nodes of a sine wave and are commonly referred to as the front and rear nodal points of the engine.

If no other engine vibrations were encountered, it would be theoretically possible to mount an engine at the nodal points directly and rigidly to the frame. However, fore and aft vibrations do occur at the nodal points. Also, since the engine is not always operated at the critical speeds, other vibrations occur in the engine throughout the range of speeds at which it is operated. For this reason, as already stated above, it is necessary to isolate the engine from the frame by the use of resilient mountings in order to prevent noise radiation by various parts of the automobile. However, when the mounts are located at or near the nodal points, lesser amplitudes of resonant vibration and less overall vibration is encountered by the mounting units, making it possible to use stiffer resilient members and still satisfactorily isolate the engine from the frame. Thus, the locating of the mounts at or near the nodal points of the engine so that stiffer resilient members may be used directly enhances other objects of the present invention, which are to provide an engine mount having greater stiffness in both vertical and horizontal directions.

In analyzing the operation of the front mounting units 12, it is apparent that oscillation of the engine 10 about the principal axis of rotation is permitted mostly by the pivot action of studs 19, during which action opposite sides of adjacent pairs of the resilient cushions 20 will be only slightly compressed. This is because a slight movement of the studs at flange 14 or at bracket 16 results in a much greater movement at the opposite end of the stud due to the length of the stud between flange 14 and bracket 16. Therefore, since the necessary deformation in compression of the resilient cushions 20 to permit oscillation of the engine is small, the cushions 20 may be made from stiffer material.

In the case of purely translational vibrations or movements of the engine, the resilient cushions 20 again react by compression. Consider the case where the car is being driven around a curve and centrifugal force moves the engine laterally to the outside. Such movement of the engine will tend to compress the outside unit 12 and to elongate the inside unit 12, depending upon the direction of turning. In such a case, the resilient cushions 20 will again be deformed in compression. However, since the resilient cushions 20, for the reasons stated above, may be made from stiffer material, the above mounting units will be stiffer in the horizontal direction of engine vibration. It is quite evident, furthermore, especially from Figure 2, that engine vibration or movement in the vertical direction will be absorbed almost entirely by compression of the stiffer resilient cushions 20.

When the automobile is driven on a road having an uneven surface, the wheels move up and down or hop freely and the frame remains relatively motionless in the vertical direction, in theory at least, due to the wheel suspension system. This, however, is only theoretical, and the vibrations of the wheels are transmitted through the wheel suspensions to the frame to sufficient extent that the passenger of the automobile is made uncomfortable. This is especially true when the engine mountings are soft in the vertical direction so that the frame is free to vibrate at wheel hop frequency without interference by the heavy engine mass. Such is the situation in engine mountings presently employed. In the proposed mounting there is relative rigidity or stiffness in the vertical direction between the frame and the engine, and vibration of the frame and wheel hop frequency is consequently more difficult since the heavy engine mass acts downwardly to interfere with or suppress frame vibration. This is true in the lateral direction as well as the horizontal direction.

The operation of the rear units 13 is substantially similar to that of the front units 12. Since the units are mounted at or near the rear nodal point, the resilient members 23 may be constructed of stiffer material. Being of stiffer material, more resistance is offered by members 23 in the lateral and vertical directions of engine vibration, which are absorbed by members 23 mainly by compression. This is true although the engine 10 is free to oscillate about the principal axis of rotation by shear of resilient members 23.

It will be observed from the foregoing specification and drawings that there has been provided an engine mounting which, in addition to permitting the engine to oscillate freely about the principal axis of rotation such as present engine mountings do, offers greater stiffness in the directions of purely vertical and lateral engine vibrations. In this manner, the heavy engine mass may be utilized to the end of suppressing rather than amplifying low frequency shaking of the frame due to wheel hop.

What is claimed is:

1. In combination in an engine mounting system, a first pair of mounts each comprising an arcuate resilient member and a pair of complementary mounting flange brackets having said resilient member bonded between adjacent ends thereof, a second pair of mounts each comprising a stud threaded at both ends and inner and outer resilient cushions received on either end of said stud and receiving mounting flanges therebetween in isolated relation to said stud and means threadingly engaging said stud and preloading said cushions in compression whereby said stud is statically loaded in tension adjacent said cushions and in compression intermediate said inner cushions, said first pair of mounts being stiffer than said second pair of mounts.

2. In an engine mounting system, the combination comprising front engine mounts and rear engine mounts cooperating to permit free oscillation of an engine mounted thereby while providing vertical and lateral stiffness, said front engine mounts being inwardly inclined to provide lateral stiffness and each including a stud having threads on each end and a pair of inner and outer cushions received on each end of said stud and receiving mounting flanges therebetween in isolated relation to said stud and means threadedly engaging said stud on each side of each of said pair of cushions and pre-loading said cushions in compression whereby said stud in statically loaded in tension adjacent said pairs of cushions and in compression intermediate said pairs of cushions to provide vertical stiffness, said rear engine mounts being inwardly inclined to provide lateral stiffness and including a first bracket and a second bracket each having complementary non-linear ends overlapping in spaced relation and a resilient member received between and secured to said spaced overlapping ends, said rear engine mounts being susbtantially stiffer than said front engine mounts.

References Cited in the file of this patent

UNITED STATES PATENTS

| | | |
|---|---|---|
| 1,606,966 | Smith-Clark | Nov. 16, 1926 |
| 1,682,786 | Harris | Sept. 4, 1928 |
| 2,028,549 | Lord | Jan. 21, 1936 |
| 2,028,551 | Lord | Jan. 21, 1936 |
| 2,044,649 | Swennes | June 16, 1936 |
| 2,076,034 | Lampman | Apr. 6, 1937 |
| 2,091,679 | Grant | Aug. 31, 1937 |
| 2,257,630 | Wahlberg et al. | Sept. 30, 1941 |
| 2,589,796 | Geldhof | Mar. 18, 1952 |